United States Patent [19]

Angelbeck

[11] 3,754,142

[45] Aug. 21, 1973

[54] HIGH FREQUENCY LAD LINE USING LOW FREQUENCY DETECTORS

[75] Inventor: Albert W. Angelbeck, Manchester, Conn.

[73] Assignee: The United States of America as represented by the Secretary of the Navy, Washington, D.C.

[22] Filed: Mar. 1, 1971

[21] Appl. No.: 119,696

[52] U.S. Cl. .................................. 250/199, 350/161

[51] Int. Cl. .................................. H04b 9/00

[58] Field of Search .................... 250/199; 307/88.3; 329/144; 333/29; 330/10; 325/430; 350/161

[56] References Cited

UNITED STATES PATENTS

| | | | |
|---|---|---|---|
| 3,539,245 | 11/1970 | Brienza | 250/199 |
| 3,132,258 | 5/1964 | Gaertner et al. | 250 199 |
| 3,544,806 | 12/1970 | De Maria et al. | 307/88.3 |
| 3,415,995 | 12/1968 | Kerr | 250/199 |
| 3,431,504 | 3/1969 | Adler | 250/199 |

*Primary Examiner*—Albert J. Mayer
*Attorney*—Richard J. Miller and R. S. Sciascia

[57] ABSTRACT

The invention disclosed herein provides an improved laser acoustic delay line having a low frequency detector in the line operating at a first frequency. This is accomplished by combining an acoustic block actuated at a first frequency and a photo detector receiver in the path of a laser beam with a second frequency to produce the first frequency by mixing.

5 Claims, 1 Drawing Figure

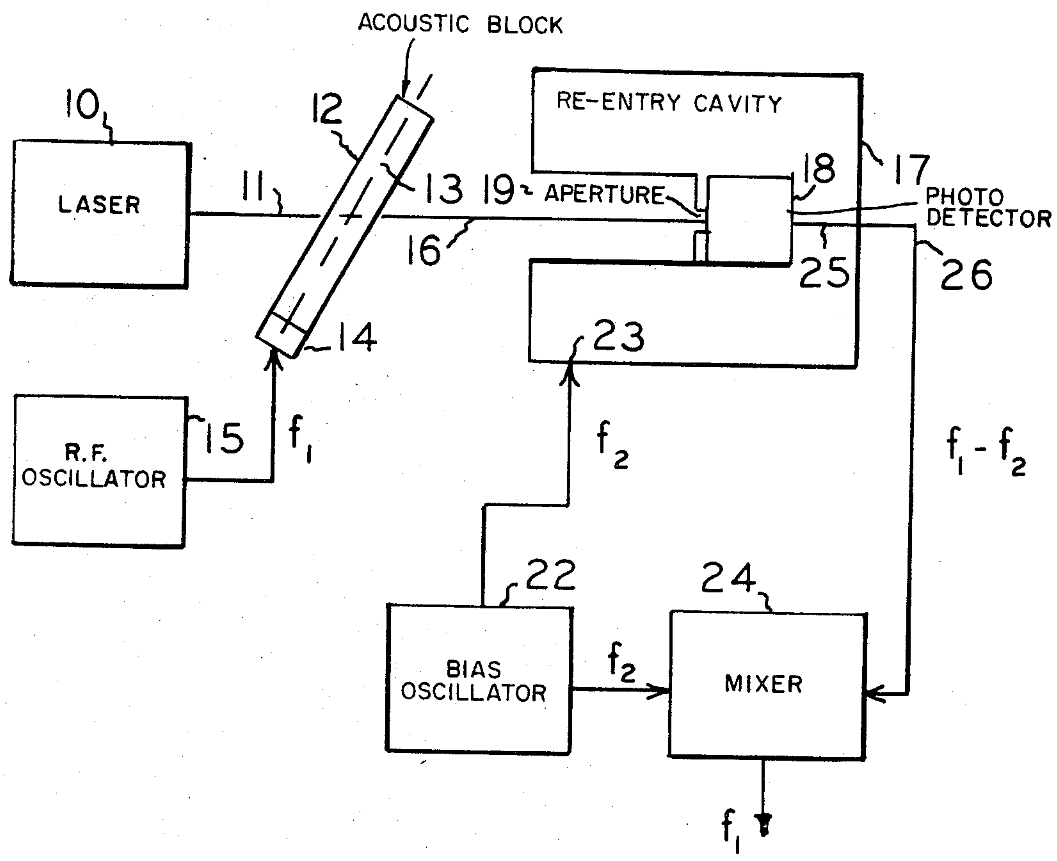
INVENTOR
ALBERT W. ANGELBECK
BY
Richard J. Miller
ATTORNEY

HIGH FREQUENCY LAD LINE USING LOW FREQUENCY DETECTORS

The basic problem in extending the frequency of operation above 1 gega-hertz in the laser acoustic delay line is that the photo detectors tend to become insensitive and expensive.

There is known technique of detecting high frequency light modulation using a low frequency detector by applying a high frequency electric field to the photo emissive surface of the detector thereby providing for photo electron current modulation at the high frequency which is close to the optical modulation frequency. In that technique a signal is generated at a low difference frequency between the light modulation frequency and the applied electric field frequency. The low frequency modulated electron stream can be amplified by the multiplication structure without transit time degradation. A configuration of this device uses a photo multiplier within a micro wave cavity. A high electric field is obtained at the photo cathode surface by use of a quarter wave re-entrant cavity in which the free end of the stub is in contact with the face of the photo multiplier. A hole through the quarter wave stub allows the light to imping on the photo cathode surface.

In many applications of the laser acoustic delay line, in particular in simulation devices, it is required that the delayed RF signal be coherent and of the same frequency as the input RF signal. Towards this end the invention disclosed herein is designed.

It is therefore an object of this invention to provide an improved laser acoustic delay line.

It is yet a further object of this invention to provide an improved laser acoustic delay line utilizing an acoustic block, a re-entry cavity having mounted therein a photo detector and an oscillator coupled thereto.

It is still a further object of this invention to provide an improved radio frequency delay signal device comprising: a source of monochromatic light projecting a light beam along a given path, an acoustic block positioned in the path, a source of radio frequency energy coupled to the block having a first frequency, a housing having a reentry cavity and a photo detector in the path mounted in the cavity, a biased oscillator having a second frequency coupled to the housing, an output circuit coupled to the photo detector and a mixer coupled to the output circuit and to the biased oscillator to combine signals to the biased oscillator and the photo detector so that the output of the mixer is at the first frequency.

Other objects, advantages and novel features of the invention will become apparent from the following detailed description of the invention when considered in conjunction with the accompanying drawings wherein:

The FIGURE discloses one configuration of the invention.

A laser 10 is provided directing its output along a path designated as 11. Positioned in the path 11 is an acoustic block 12, made either of quartz or lithium niobate having an axis 13 forming an angle with the axis of the path 11 of the laser beam. Coupled to the acoustic block, at point 14, is an input RF signal from an RF oscillator 15 having an output frequency designated as $f_1$.

The output from the acoustic block, shown along path 16, is the laser beam 11 modulated at frequency $f_1$. There is further provided a re-entry cavity 17 having mounted therein a photo detector 18 and having an aperture designated by 19. The incoming modulated laser signal passes through the aperture 19 and impinges on photo detector 18.

In addition, there is a biased oscillator 22 generating a frequency $f_2$ which is coupled to the re-entry cavity 17 at point 23, and is also coupled to a mixer designated as 24. The output of the photo detector at 25 is coupled through a connecting line 26 to a mixer 24. The signal detected by the photo detector is that which is the difference signal between the laser beam modulated at $f_1$ and the biased oscillator $f_2$ whose signal is designated as $f_1$–$f_2$.

The mixer has incoming signals $f_2$, and signal ($f_1$–$f_2$). In normal mixer operation these two signals would be combined and the output would be the two signals plus the sum and difference signals. The important one which is utilized subsequently is the sum signal which is the signal $f_1$, which is the RF input signal coupled to the acoustic block.

Obviously many modifications and variations of the present invention are possible in the light of the above teachings. It is therefore to be understood that within the scope of the appended claims the invention may be practiced otherwise than as specifically described.

I claim:

1. An improved radio frequency delayed signal device, comprising;

a. a source of monochromatic light projecting a light beam along a given path;
b. an acoustic block positioned in said path;
c. a source of radio frequency energy coupled to said block having a first frequency;
d. a housing having a re-entry cavity including an entry aperture and a photo detector in said housing re-entry cavity positioned in said path, said acoustic block positioned between said source and said housing and said entry aperture positioned between said block and said photo detector;
e. a bias oscillator having a second frequency coupled to said housing;
f. an output circuit coupled to said photo detector, and;
g. a mixer coupled to said output circuit and to said bias oscillator to combine signals from said bias oscillator and said photo detector so that the output of said mixer is at said first frequency.

2. The signal device of claim 1 wherein the acoustic block is mounted at the Brewster angle with respect to the laser beam.

3. The device of claim 1 wherein the acoustic block is made of one of the compounds from a group composed of quartz and lithium niobate.

4. The device of claim 1 wherein said first frequency is in the range of the effective range of said photo detector.

5. The device of claim 1 wherein said re-entry cavity includes said photo detector.

* * * * *